(12) United States Patent
Galić et al.

(10) Patent No.: US 8,242,732 B2
(45) Date of Patent: Aug. 14, 2012

(54) APPARATUS, SYSTEM AND METHOD FOR STEPPER MOTOR STALL DETECTION

(75) Inventors: Gordan Galić, Strmec Samoborski (HR); Goran Fiolić, Pagbeb (HR)

(73) Assignee: Xylon d.o.o. (HR)

( * ) Notice: Subject to any disclaimer, the term of this patent is extended or adjusted under 35 U.S.C. 154(b) by 25 days.

(21) Appl. No.: 12/641,329

(22) Filed: Dec. 18, 2009

(65) Prior Publication Data

US 2011/0181229 A1      Jul. 28, 2011

(51) Int. Cl.
  *H02P 8/34*   (2006.01)
  *G05B 19/40*  (2006.01)

(52) U.S. Cl. ......... 318/696; 318/282; 318/569; 318/685

(58) Field of Classification Search ........... 318/282, 318/569, 685, 696
See application file for complete search history.

(56) References Cited

U.S. PATENT DOCUMENTS

| | | | | |
|---|---|---|---|---|
| 5,670,852 A * | 9/1997 | Chipperfield et al. | ........ | 318/250 |
| 6,150,789 A * | 11/2000 | Pulford, Jr. | ........ | 318/685 |
| 6,653,810 B2 * | 11/2003 | Lo | ........ | 318/569 |
| 6,756,749 B2 * | 6/2004 | Haas et al. | ........ | 318/34 |
| 7,116,070 B2 * | 10/2006 | MacKay | ........ | 318/400.11 |
| 7,432,682 B2 * | 10/2008 | Rondot et al. | ........ | 318/696 |
| 7,705,555 B2 * | 4/2010 | Pinewski et al. | ........ | 318/696 |
| 7,812,562 B2 * | 10/2010 | Russ | ........ | 318/685 |
| 7,880,423 B2 * | 2/2011 | Russ et al. | ........ | 318/696 |
| 8,058,894 B2 * | 11/2011 | De Cock | ........ | 324/765.01 |
| 2002/0093303 A1 * | 7/2002 | Lo | ........ | 318/569 |
| 2003/0137271 A1 * | 7/2003 | Haas et al. | ........ | 318/685 |
| 2004/0027089 A1 * | 2/2004 | Forsey | ........ | 318/685 |
| 2006/0038517 A1 * | 2/2006 | MacKay | ........ | 318/254 |
| 2006/0152098 A1 * | 7/2006 | Horst et al. | ........ | 310/120 |
| 2009/0153093 A1 * | 6/2009 | Pinewski et al. | ........ | 318/696 |
| 2009/0160390 A1 * | 6/2009 | Russ et al. | ........ | 318/696 |
| 2009/0174358 A1 * | 7/2009 | Russ | ........ | 318/685 |
| 2010/0244887 A1 * | 9/2010 | De Cock | ........ | 324/772 |

* cited by examiner

*Primary Examiner* — Paul Ip
(74) *Attorney, Agent, or Firm* — Steven Rinehart

(57) ABSTRACT

An apparatus, system, and method are disclosed for stepper motor 102 stall detection. A conversion module 106 receives 1206 a back electromotive force ("EMF") waveform 1002 produced in a non-driven coil of the stepper motor 102 by a magnetic field of a rotor of the stepper motor 102 during a full step operation 308, and samples 1208 the waveform 1002 at intervals starting at a predetermined time for a predetermined period of time within the full step operation 308 to yield a plurality of sampled data points. A rectification module 202 rectifies 1210 the waveform 1002 about a predetermined quiescent level 306. A comparison module 204 accumulates 1216 the rectified sampled data points into a statistically representative sampled value, compares the representative sampled value to a predetermined threshold level, and indicates 1224 a stall of the rotor if the representative sampled value is less than the predetermined threshold level.

20 Claims, 7 Drawing Sheets

APPARATUS, SYSTEM AND METHOD FOR STEPPER MOTOR STALL DETECTION

BACKGROUND OF THE INVENTION

1. Field of the Invention

The present invention relates generally to stepper motor drive circuits. More specifically, the present invention relates to stepper motor stall detection.

2. Description of the Related Art

Instrumentation devices must be carefully designed with regard to accuracy. An ultimate requirement for such devices based on stepper motors is to preset the rotor of the stepper motor into a known position (zero position) at system start up time. Zero positioning typically involves stepper motor stall detection which occurs when the motor's rotor is prevented from rotation by some mechanical obstacle.

Methods for stall detection may be sensor-based, or sensorless and based on monitoring different phenomena occurring in the motor during stall. Since stepper motors are controlled in the open loop, loss of synchronization caused by a mechanical failure, vibration, temperature drift, and so forth, may cause cumulative errors, and as a consequence, incorrect instrument readings. These same variable factors pose a significant challenge to accurate zero positioning.

SUMMARY

From the foregoing discussion, it should be apparent that a long-felt unmet need exists for robust stepper motor stall detection to achieve accurate zero positioning. Beneficially, such a means would belong to the aforementioned group of "sensorless" methods, and be based upon back electromotive force ("EMF") measurement across the non-driven stepper motor coil.

The present invention has been developed in response to the present state of the art, and in particular, in response to the problems and needs in the art that remain intractable with currently available inventions. Accordingly, the present invention has been developed to provide an apparatus, system, and method for stepper motor stall detection that overcome many or all of the above-discussed shortcomings in the art.

One approach detects a stall in a stepper motor by measuring back EMF generated in the non-driven stepper motor coil during a full step operation. Measurement results may be digitally processed in order to derive a statistically representative value of the generated back EMF. The derived value is then compared to a predetermined threshold in order to detect a possible stepper motor stall condition.

Another approach might employ one or more analog elements in lieu of digital processing. For example, analog rectification could be used prior to digital sampling instead of digital rectification of the sampled data. In a further embodiment, the rectified signal could be smoothed and then compared with a quiescent reference voltage via an analog comparator in lieu of digital sampling and analysis.

The apparatus to detect a stepper motor stall condition is provided with a plurality of modules configured to functionally execute the necessary steps of receiving an electrical waveform produced in a non-driven coil of the stepper motor, rectifying it, sampling it, and accumulating the sampled data into a statistically representative value for comparison with a predetermined threshold to indicate the stall condition. These modules in the described embodiments include a conversion module, a rectification module, and a comparison module.

The conversion module may receive an electrical waveform produced in a non-driven coil of a stepper motor by a magnetic field of a rotor of the stepper motor during a full step operation. It then may sample the electrical waveform at intervals starting at a predetermined time for a predetermined period of time within the full step operation to yield a plurality of sampled data points. In an embodiment, the conversion module may comprise an analog-to-digital converter ("ADC").

The rectification module may then rectify the electrical waveform about a predetermined quiescent level. In one embodiment, the rectification module may receive the sampled data point from the conversion module, and set the sampled data point equal to the received sampled data point minus the predetermined quiescent level if the sampled data point is greater than or equal to the predetermined quiescent level, and set the sampled data point equal to the predetermined quiescent level minus the received sampled data point minus if the sampled data point is less than or equal to the predetermined quiescent level. In another embodiment, the rectification module may comprise an analog rectifier that rectifies the electrical waveform to be received by the conversion module.

The comparison module may then accumulate the sampled data points into a statistically representative sampled value, compare the representative sampled value to a predetermined threshold level, and indicate a stall of the rotor if the representative sampled value is less than the predetermined threshold level. In one embodiment, the statistically representative sampled value may comprise an average sampled value.

In one embodiment, the predetermined time may be chosen so as to omit a noisy transient leading portion of the electrical waveform, and the predetermined time period may be chosen so as to omit a quiescent trailing portion of the electrical waveform.

A system of the present invention is also presented to detect a stepper motor stall condition. The system may include one or more stepper motors, a plurality of tri-state drivers that drive a plurality of coils of the one or more stepper motors, the ADC, the rectification module, the comparison module, and a controller that is in electrical communication with the plurality of tri-state drivers and the ADC and activates one or more of the rectification module and the comparison module. In an embodiment, the plurality of coils may be driven by the plurality of tri-state drivers with a displacement of 60 degrees, 90 degrees, and so forth.

In one embodiment, the rectification module may receive the sampled data point from the ADC, and set the sampled data point equal to the received sampled data point minus the predetermined quiescent level if the sampled data point is greater than or equal to the predetermined quiescent level, and set the sampled data point equal to the predetermined quiescent level minus the received sampled data point minus if the sampled data point is less than or equal to the predetermined quiescent level. In another embodiment, the rectification module may comprise an analog rectifier that rectifies the electrical waveform to be received by the ADC.

In particular, the system, in one embodiment, may further comprise a biasing resistor network, attached to a pole of the non-driven coil that is not connected toward the ADC, to bias the electrical waveform about the predetermined quiescent level.

The system may further include a multiplexor that selects the electrical waveform produced in the non-driven coil from among the plurality of coils, and a voltage buffer that buffers the electrical waveform.

A method of the present invention is also presented for detecting a stepper motor stall condition. The method in the disclosed embodiments substantially includes the steps necessary to carry out the functions presented above with respect to the operation of the described apparatus and system.

In one embodiment, the method includes receiving an electrical waveform produced in a non-driven coil of a stepper motor by a magnetic field of a rotor of the stepper motor during a full step operation, rectifying the electrical waveform about a predetermined quiescent level, sampling the electrical waveform at intervals starting at a predetermined time for a predetermined period of time within the full step operation to yield a plurality of sampled data points, accumulating the sampled data points into a statistically representative sampled value, comparing the representative sampled value to a predetermined threshold level, and indicating a stall of the rotor if the representative sampled value is less than the predetermined threshold level.

In an embodiment, rectifying may comprise analog rectification or digital rectification. In one embodiment, accumulating the sampled data points into a statistically representative sampled value may comprise averaging the sampled data points. In a further embodiment, receiving may comprise selecting the electrical waveform produced in the non-driven coil of the stepper motor through a multiplexor from among a plurality of coils of the stepper motor, and buffering the electrical waveform through a voltage buffer.

In a further embodiment, the method may include calibration. Calibrating may comprise receiving the electrical waveform produced in the non-driven coil of the stepper motor by the magnetic field of the rotor of the stepper motor during one or more full step operations, sampling the electrical waveform at intervals starting at the predetermined time for the predetermined period of time within the one or more full step operations to yield a plurality of sampled data points, accumulating the sampled data points into a statistically representative quiescent sampled value, and initializing the predetermined quiescent level to the statistically representative quiescent sampled value. Note that calibration can be performed either during rotation or stall, since the objective is to determine a direct current ("DC") voltage level, which is theoretically constant in either case.

Reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussion of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize that the invention may be practiced without one or more of the specific features or advantages of a particular embodiment. In other instances, additional features and advantages may be recognized in certain embodiments that may not be present in all embodiments of the invention.

These features and advantages of the present invention will become more fully apparent from the following description and appended claims, or may be learned by the practice of the invention as set forth hereinafter.

BRIEF DESCRIPTION OF THE DRAWINGS

In order that the advantages of the invention will be readily understood, a more particular description of the invention will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which.

DETAILED DESCRIPTION OF THE INVENTION

Many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of executable code may, for instance, comprise one or more physical or logical blocks of computer instructions which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of executable code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network. Where a module or portions of a module are implemented in software, the software portions are stored on one or more computer readable media.

Reference to a computer readable medium may take any form capable of storing machine-readable instructions on a digital processing apparatus. A computer readable medium may be embodied by a transmission line, a compact disk, digital-video disk, a magnetic tape, a Bernoulli drive, a magnetic disk, a punch card, flash memory, integrated circuits, or other digital processing apparatus memory device.

Figure 1:
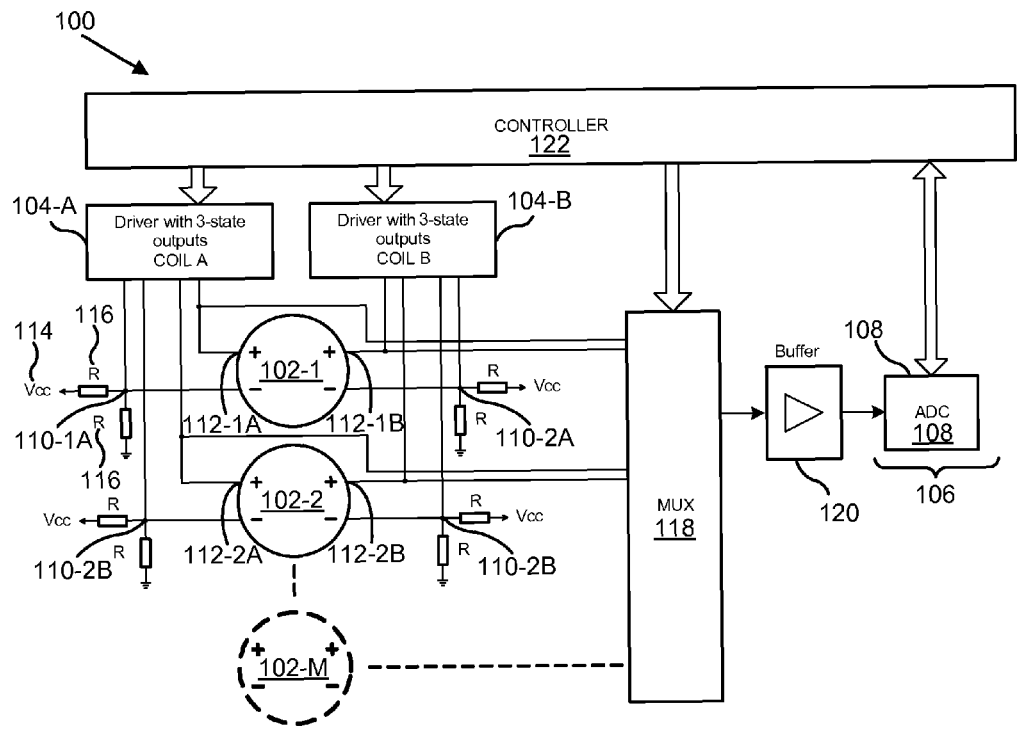
FIG. 1 is a schematic block diagram illustrating one embodiment of a system for stepper motor stall detection.

FIG. 1 is a schematic block diagram illustrating one embodiment of a system 100 for stepper motor 102 stall detection. The system 100 comprises one or more stepper motors 102, and additional circuitry for driving the motors and detecting a stall. The driving circuit is comprised of tri-state drivers 104 for being able to measure generated back electromotive force ("EMF") in a non-driven coil (not shown). A conversion module 106 used for measuring generated back EMF, in the illustrated embodiment, is a single supply analog-to-digital converter ("ADC") 108 having a non-differential input. Since the ADC 108 in this embodiment is incapable of handling negative voltages, the coil of each motor 102 has a biasing resistor network 110 attached to the pole that is opposite to the pole 112 connected towards the ADC 108. A source voltage 114 Vcc is used for powering the ADC 108, and as the reference voltage for the ADC 108. The biasing resistor network 110, comprising two identical resistors 116 is also powered using the Vcc source voltage 114, thus biasing the coils of the stepper motor 102 to the middle of the conversion range of the ADC 108. The resistor 116 values may typically be in a range of few tens of kilo-ohms.

In order to utilize the same ADC 108 for performing measurements on the coils of all stepper motors 102, an analog multiplexor 118 is added to the system 100. To zero-position the rotor of stepper motor 102-1, the multiplexor 118 may select the pole 112-1A or 112-1B of the non-driven coil, as biased with resistor network 110-1A or 110-1B respectively, while driving the opposite coil with tri-state driver 104-B or 104-A respectively. To zero-position the rotor of stepper motor 102-2, the multiplexor 118 may select the pole 112-2A or 112-2B of the non-driven coil, as biased with resistor network 110-2A or 110-2B respectively, while driving the opposite coil with tri-state driver 104-B or 104-A respectively, and so on up to and including stepper motor 102-M.

Since the coils combined with the biasing resistor network 110 represent a high impedance voltage source, a voltage buffer 120 is introduced in order to get a low impedance voltage source for driving the analog input of the ADC 108. The whole process is controlled by a controller 122 which may be implemented using, for example, a microcontroller, an FPGA device, or the like.

Figure 2:
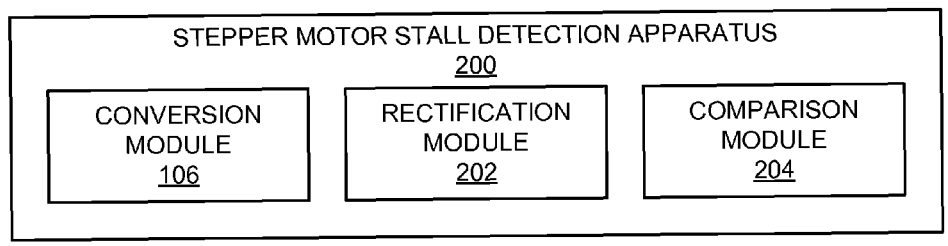
FIG. 2 is a schematic block diagram of an apparatus for stepper motor stall detection.

FIG. 2 is a schematic block diagram of an apparatus 200 for stepper motor stall detection, comprising the conversion module 106, a rectification module 202, and a comparison module 204. The conversion module 106 receives an electrical waveform produced in the non-driven coil of the stepper motor 102 by a magnetic field of a rotor of the stepper motor 102 during a full step operation. It then samples the electrical waveform at intervals within the full step operation to yield a plurality of sampled data points. The rectification module 202 rectifies the electrical waveform about the middle of the conversion range. The comparison module 204 accumulates the sampled data points into a statistically representative sampled value, compares the representative sampled value to a predetermined threshold level, and indicates a stall of the rotor if the representative sampled value is less than the predetermined threshold level.

In another embodiment, the rectification module may comprise an analog rectifier, such as a full bridge rectifier, a half bridge rectifier, or the like. In a further embodiment, the conversion module may comprise a smoothing circuit, such as a capacitive circuit having a time constant that maintains the rectified voltage above the predetermined threshold level for the duration of the full step operation if the rotor of the stepper motor 102 is rotating freely. The comparison module may comprise an analog comparator that compares the rectified smoothed waveform to the predetermined threshold level, and indicates a stall of the rotor if the rectified smoothed waveform is below the predetermined threshold level.

Figure 3:
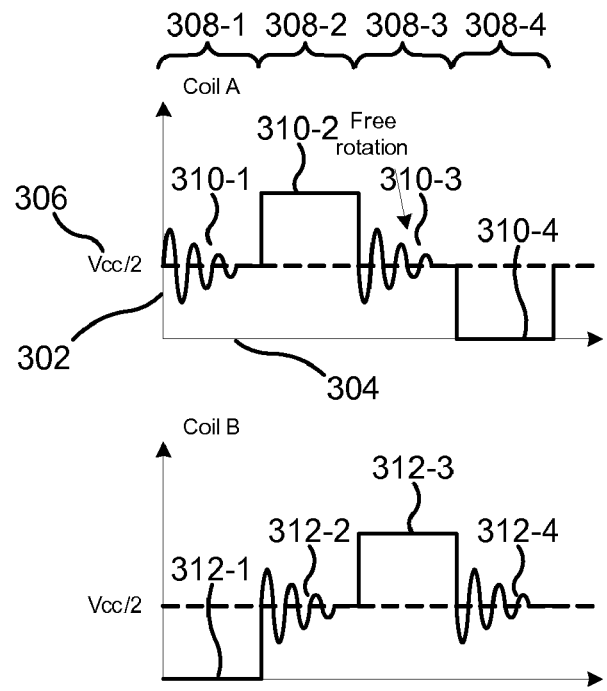
FIG. 3 is a timing diagram illustrating an electrical waveform of back electromotive force ("EMF") in a non driven coil during free movement of a rotor.

FIG. 3 is a timing diagram illustrating an electrical waveform of back EMF in a non driven coil during free movement of the rotor. The y-axis 302 represents voltage and the x-axis 304 represents time. The middle of the conversion range Vcc/2 is a predetermined quiescent level 306, about which the coil A level 310 and the coil B level 312 may vary. Four consecutive full step operations 308 are shown. When the motor's shaft moves freely, the EMF is generated in the non-driven coil due to the variable magnetic field produced by the magnetic rotor of the stepper motor 102 passing the coil.

In the first full step operation 308-1, the coil B level 312-1 is driven low. The fluctuating coil A level 310-1 shows that the rotor was not stalled but moved past coil A. In the second full step operation 308-2, the coil A level 310-2 is driven high. The fluctuating coil B level 312-2 shows that the rotor was not stalled but moved past coil B. In the third full step operation 308-3, the coil B level 312-3 is driven high. The fluctuating coil A level 310-3 shows that the rotor was not stalled but moved past coil A. In the fourth full step operation 308-4, the coil A level 310-4 is driven low. The fluctuating coil B level 312-4 shows that the rotor was not stalled but moved past coil B.

Figure 4:
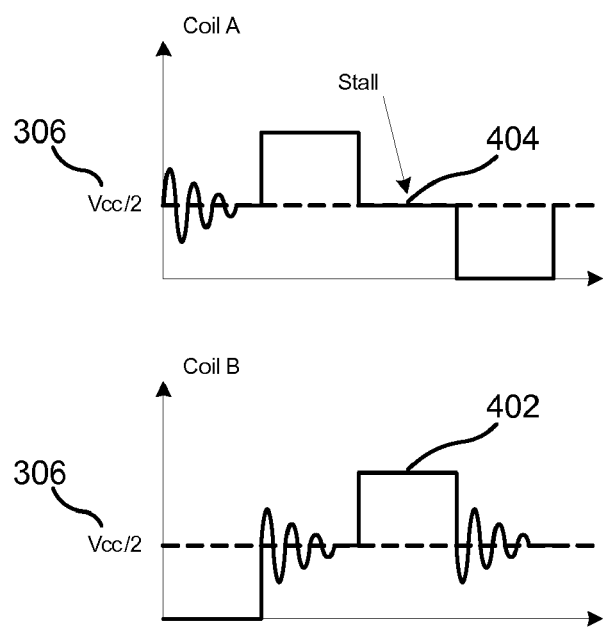
FIG. 4 is a timing diagram illustrating an electrical waveform of back EMF in a non driven coil during a stall condition of the rotor.

FIG. 4 is a timing diagram illustrating an electrical waveform of back EMF in a non driven coil during a stall condition of the rotor. In case of a stall condition the rotor does not turn, the variable magnetic field is not present, and as a consequence, the induced EMF drops down to the predetermined quiescent level 306. This change in the back EMF amplitude is used for detecting stepper motor stall.

In this example, the first, second, and fourth full step operations 308-1, 2, and 4 are the same as before. In the third full step operation 308-3, the coil B level 404 is driven high, which is also the same as before. However, the quiescent coil A level 402 shows that the rotor was stalled and did not move past coil A.

Figure 5:
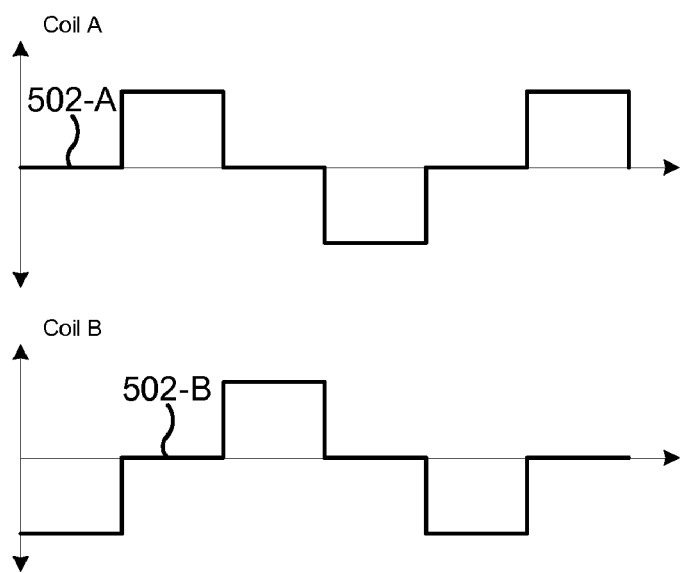
FIG. 5 is a timing diagram illustrating an electrical waveform of voltage applied to the stepper motor with coil driving signals displaced by 90 degrees.

FIG. 5 is a timing diagram illustrating an electrical waveform of voltage applied to the stepper motor 102 with coil driving signals 502 displaced by 90 degrees. The stepper motor 102 in this case may be one manufactured by Moving Magnet Technologies ("MMT") or the like. For detecting the stall condition, the presented approach uses full step mode for rotating the stepper motor 102. Voltage is applied to the MMT motor where the coil driving signals 502 are displaced by 90 degrees. As can be seen, the coil B driving signal 502-B trails the coil A driving signal 502-A by 90 degrees.

Figure 6:
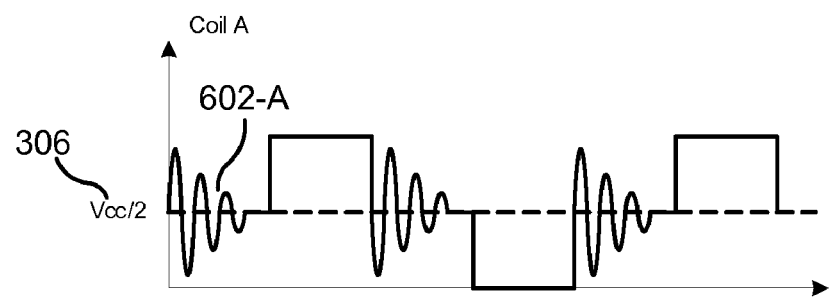
FIG. 6 is a timing diagram illustrating electrical waveforms on coil poles connected towards an analog-to-digital converter ("ADC") with coil driving signals displaced by 90 degrees.
Figure 6:

FIG. 6 is a timing diagram illustrating electrical waveforms on coil poles 112 connected towards the ADC 108 with coil driving signals 502 displaced by 90 degrees. In this case, the MMT motor is being driven during normal rotation, as can be seen by the fluctuating coil levels 602 due to induced back EMF. The coil A level 602-A fluctuates when the coil A driving signal 502-A is not being driven high or low by the tri-state driver 104-A. The coil B level 602-B fluctuates when the coil B driving signal 502-A is not being driven high or low by the tri-state driver 104-B. Reflecting the 90-degree displacement of the coil driving signals 502, the coil B level 602-B trails the coil level A 602-A by 90 degrees.

Figure 7:
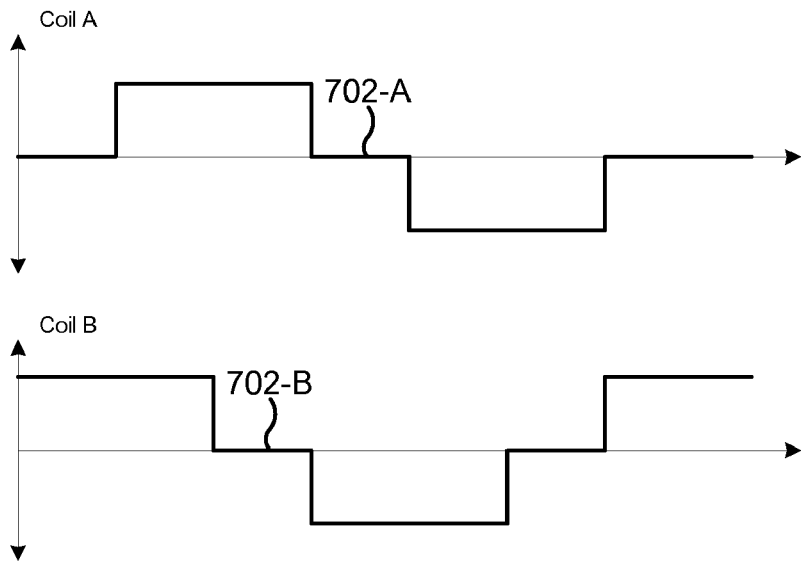
FIG. 7 is a timing diagram illustrating an electrical waveform of voltage applied to the stepper motor with coil driving signals displaced by 60 degrees.

FIG. 7 is a timing diagram illustrating an electrical waveform of voltage applied to the stepper motor with coil driving signals 702 displaced by 60 degrees, another type of full step driving sequence. The stepper motor 102 in this case may be one manufactured by Switec or the like. As can be seen, the coil A driving signal 702-A trails the coil B driving signal 702-B by 60 degrees.

Figure 8:
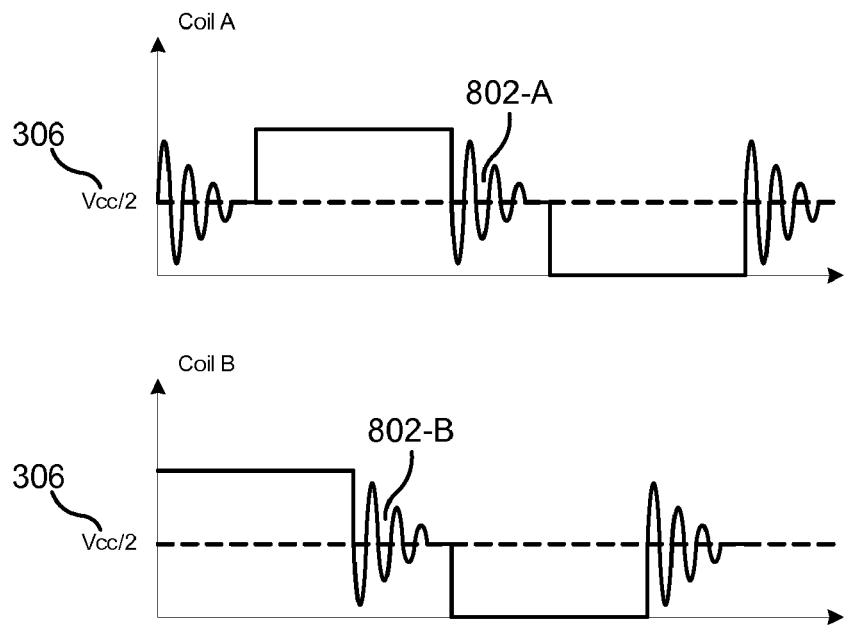
FIG. 8 is a timing diagram illustrating electric waveforms on coil poles connected towards the ADC with coil driving signals displaced by 60 degrees.

FIG. 8 is a timing diagram illustrating electric waveforms on coil poles 122 connected towards the ADC 108 with coil driving signals 702 displaced by 60 degrees. In this case, the Switec motor is being driven during normal rotation, as can be seen by the fluctuating coil levels 802 due to induced back EMF. The coil A level 802-A fluctuates when the coil A driving signal 702-A is not being driven high or low by the tri-state driver 104-A. The coil B level 802-B fluctuates when the coil B driving signal 702-B is not being driven high or low by the tri-state driver 104-B. Reflecting the 60-degree displacement of the coil driving signals 702, the coil A level 802-A trails the coil level B 802-B by 60 degrees.

In both the 90-degree and the 60-degree case, the generated back EMF has an approximate form of a damped sinusoidal oscillation with a mean value set to the predetermined quiescent level 306 of Vcc/2 by the biasing resistor network 110. It may also be seen that the generated back EMF is present across the coil when that particular coil is non-energized.

Figure 9:
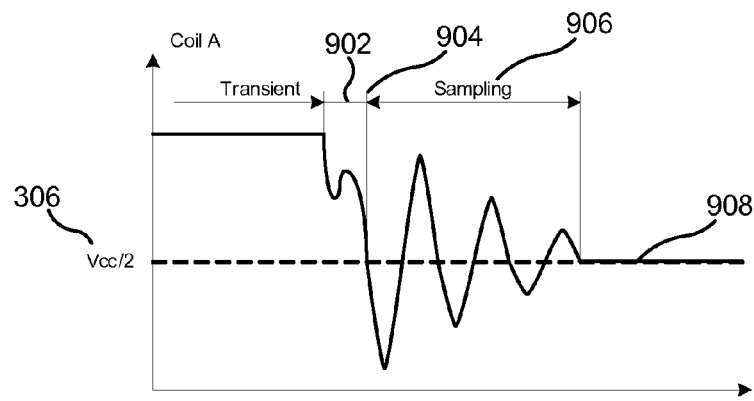
FIG. 9 is a timing diagram illustrating an electric waveform of back EMF at the ADC input.

FIG. 9 is a timing diagram illustrating an electric waveform of back EMF at the ADC 108 input. The actual hardware that is used for measuring generated back EMF in non-energized coil may be comprised of the analog multiplexor 118, voltage buffer 120 and ADC 108. The multiplexing scheme assumes that one multiplexed channel is "active" (routed towards ADC 108) for the whole step duration. When the channel is activated there is a certain time (around 150 us) required for the multiplexor output to settle, and to start outputting a correct back EMF waveform. Due to the mentioned transient effects, the actual measurement (sampling) should be delayed until this noisy transient leading portion 902 expires at a predetermined time 904. The predetermined period of time 906 for sampling depends on the EMF waveform duration within a step, and it should be adjusted accordingly, to expire prior to the quiescent trailing portion 908.

The number of ADC samples taken within the predetermined period of time 906 depends on back EMF frequency. The method hereafter described may use a number of samples selected such that the back EMF waveform between two consecutive samples does not change more than the resolution in volts of the ADC 108.

Figure 10:
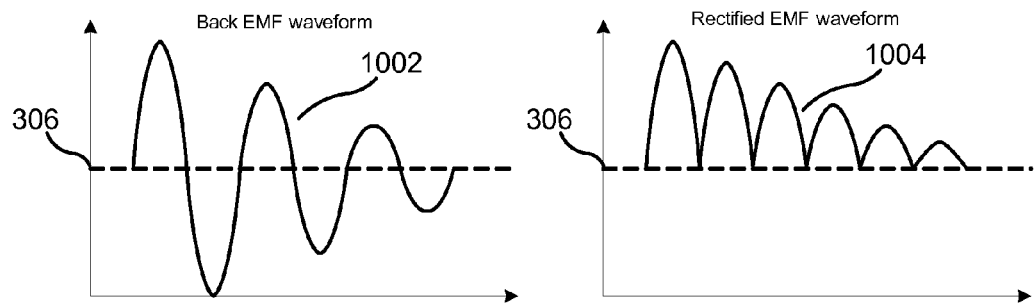
FIG. 10 is a timing diagram illustrating electric waveforms of back EMF related to the measurement results processing.

FIG. 10 is a timing diagram illustrating electric waveforms of back EMF related to the measurement results processing. As already mentioned, the back EMF waveform 1002 has a form of a damped sinusoidal oscillation with a mean value set to the predetermined quiescent level 306 of Vcc/2 by the biasing resistor network 110.

Every ADC sample whose value is below the predetermined quiescent level 306 value (Vcc/2) is considered "negative", and is converted into a "positive" value by mirroring the sample's value around the predetermined quiescent level 306 (Vcc/2). This, in turn, produces a rectified waveform 1004 which is a rectified copy of the input back EMF waveform 1002. In an embodiment, digital rectification may be performed by the rectification module 202, comprising digital post-processing of a plurality of sampled data points by a method to be described hereafter.

In another embodiment, the rectification module 202 may comprise an analog rectifier (not shown) that performs analog rectification of the output of the multiplexor 118 to produce the rectified waveform 1004 as input to the ADC 108. Under that approach, the separate biasing resister network 110 may not be required. The rectification module 202 may comprise a full bridge rectifier, a half bridge rectifier, or the like.

Figure 11:
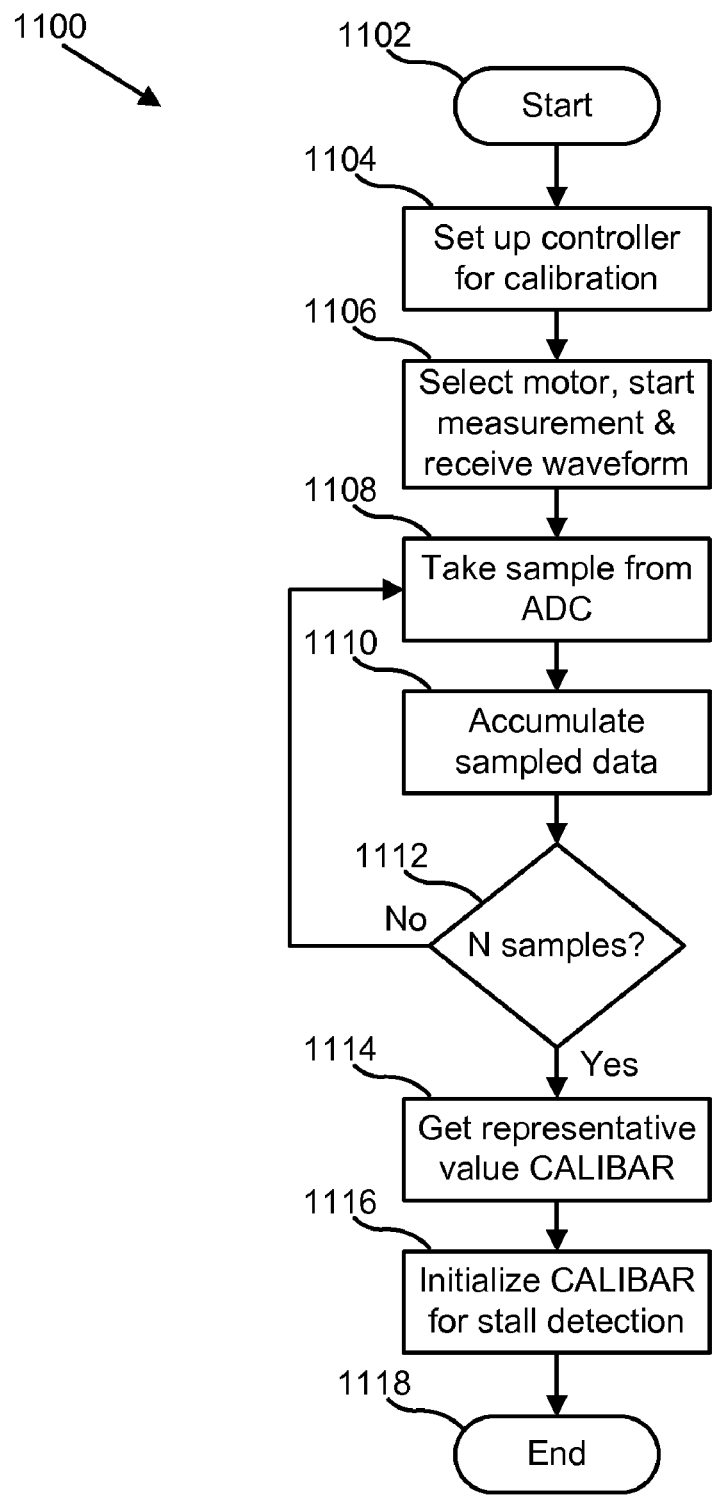
FIG. 11 is a schematic flow chart diagram illustrating a method for calibration of stepper motor stall detection.

FIG. 11 is a schematic flow chart diagram illustrating a method 1100 for calibration of stepper motor 102 stall detection. For correct stall detection, a Vcc/2 bias value set by the biasing resistor network 110 should be measured to obtain the actual predetermined quiescent level 306. Without such calibration, and merely assuming some typical value for Vcc/2, the algorithm that uses the predetermined quiescent level 306 for processing measurement data may produce incorrect results.

The method 1100 starts 1102 and sets up 1104 the controller 122 for calibration. The back EMF waveform 1002 produced in the non-driven coil of the stepper motor 102 by the magnetic field of the rotor selected via the multiplexor 118 is received 1106 during one or more full step operations 308. In an embodiment, the selected waveform 1002 may be received 1106 through a voltage buffer 120 in order to get a low impedance voltage source for driving the analog input of the ADC 108. The waveform 1002 is sampled 1108 by the ADC 108 at an interval starting at the predetermined time 904 to yield a sampled data point. The sampled data point is then accumulated 1110, such as by storing it into an array, summing it into a total, and the like. If the predetermined period of time 906 has not elapsed 1112, such as may be inferred by the number of samples taken being less than a predetermined number N, then the waveform 1002 is sampled 1108 at the next consecutive interval and the process continues to accumulate 1110 successive sampled data points.

When the predetermined period of time 906 has elapsed 1112, such as may be inferred by the number of samples taken having reached N, then the accumulated sampled data points are used to get 1114 a statistically representative quiescent sampled value, here denoted as CALIBAR. In an embodiment, CALIBAR may comprise the arithmetic average of the plurality of sampled data points, obtained by dividing the sum of the sampled data points by N. In other embodiments, it may comprise a geometric mean, a harmonic mean, and so forth. The predetermined quiescent level 306 is then initialized 1116 to the value CALIBAR and the method 1100 ends 1118.

Figure 12:
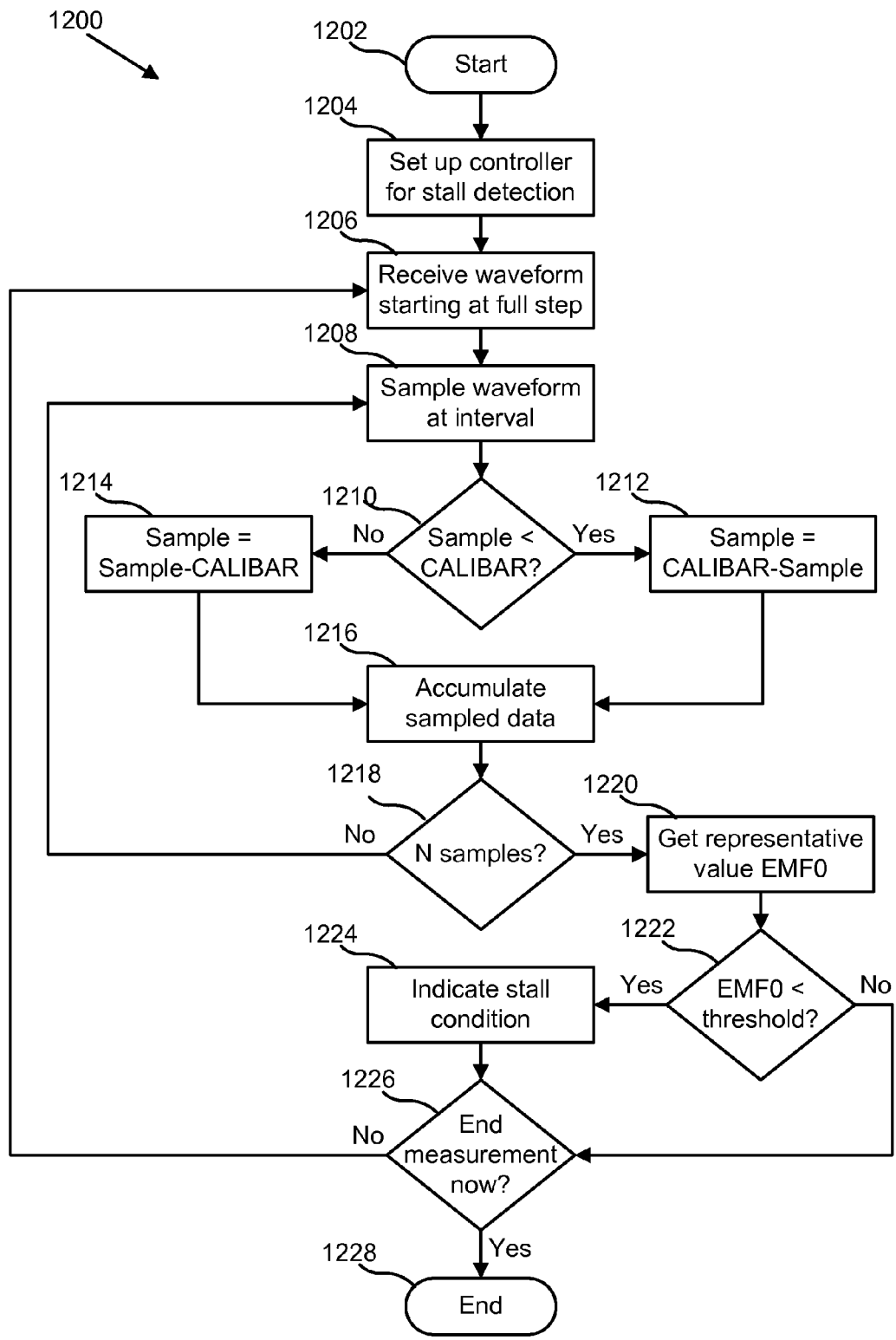
FIG. 12 is a schematic flow chart diagram illustrating a method for stepper motor stall detection, in accordance with the present invention.

FIG. 12 is a schematic flow chart diagram illustrating a method 1200 for stepper motor 102 stall detection, in accordance with the present invention, by using ADC samples of the back EMF waveform 1002. The method 1200 starts 1202 and sets up 1204 the controller 122 for stall detection. The back EMF waveform 1002 produced in the non-driven coil of the stepper motor 102 by the magnetic field of the rotor selected via the multiplexor 118 is received 1206 starting at a full step operation 308. In an embodiment, the selected waveform 1002 may be received 1206 through a voltage buffer 120 in order to get a low impedance voltage source for driving the analog input of the ADC 108. The waveform 1002 is sampled 1208 by the ADC 108 at an interval starting at the predetermined time 904 to yield a sampled data point. The sampled data point is then rectified 1210. Specifically, if the sampled data point is less than or equal to CALIBAR, the value of the predetermined quiescent level 306, then it is subtracted 1212 from CALIBAR to yield a rectified sampled data point. If it is greater than or equal to CALIBAR, then CALIBAR is subtracted 1214 from it to yield the rectified sampled data point.

The rectified sampled data point is then accumulated 1216, such as by storing it into an array, summing it into a total, and the like. If the predetermined period of time 906 has not elapsed 1218, such as may be inferred by the number of samples taken being less than a predetermined number N, then the waveform 1002 is sampled 1208 at the next consecutive interval and the process continues to accumulate 1216 successive rectified sampled data points.

When the predetermined period of time 906 has elapsed 1218, such as may be inferred by the number of samples taken having reached N, then the accumulated rectified sampled data points are used to get 1220 a statistically representative sampled value, here denoted as EMF0. In an embodiment, EMF0 may comprise the arithmetic average of the plurality of rectified sampled data points, obtained by dividing the sum of the rectified sampled data points by N. In other embodiments, it may comprise a geometric mean, a harmonic mean, and so forth. The result is a value which represents the generated back EMF for the full step operation 308 of that particular rotor. This approach increases the difference between CALIBAR, the statistically representative value for the back EMF waveform during normal rotation, and EMF0, the statistically representative value for the back EMF waveform during a stall condition, thus increasing the reliability of the stall detection method.

If EMF0 is less than 1222 a predetermined threshold level, implying that it is at or near zero, then a stall condition is indicated 1224. The predetermined threshold level is set to a value that enables reliable detection of the stall condition, which cannot be affected by different loads mounted on the rotor of the stepper motor 102, temperature drifts, differences between motors from the same series, and so forth. The value of the predetermined threshold level is established empirically.

If EMF0 is not less than 1222 the predetermined threshold level, and the measurement process has not yet ended 1226, then the back EMF waveform 1002 produced in the non-driven coil of the stepper motor 102 by the magnetic field of the rotor selected via the multiplexor 118 is received 1206 starting at the next full step operation 308, and the method 1200 continues as described above. In an embodiment, the measurement process may not be ended 1226 until the rotor has completed one full revolution or a stall condition has been indicated 1224. When the measurement process has ended 1226 then the method 1200 ends 1228.

In one embodiment, the whole calibration method 1100 and stall detection method 1200 may largely be implemented digitally by the controller 122. In other embodiments, one or more analog modules may be employed, such as an analog rectifier, a smoothing circuit, an analog comparator, and the like.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. An apparatus comprising:
a conversion module that
receives an electrical waveform produced in a non-driven coil of a stepper motor by a magnetic field of a rotor of the stepper motor during a full step operation, and
samples the electrical waveform at intervals starting at a predetermined time for a predetermined period of time within the full step operation to yield a plurality of sampled data points;
a rectification module that rectifies the electrical waveform about a predetermined quiescent level; and
a comparison module that
accumulates the sampled data points into a statistically representative sampled value,
compares the representative sampled value to a predetermined threshold level, and
indicates a stall of the rotor if the representative sampled value is less than the predetermined threshold level,
wherein the conversion module, the rectification module, and the comparison module comprise one or more of logic hardware and executable code, the executable code stored on one or more computer-readable media.

2. The apparatus of claim 1, wherein the predetermined time is chosen so as to omit a noisy transient leading portion of the electrical waveform, and the predetermined time period is chosen so as to omit a quiescent trailing portion of the electrical waveform.

3. The apparatus of claim 1, wherein the conversion module comprises an analog to digital converter ("ADC").

4. The apparatus of claim 1, wherein the rectification module receives the sampled data point from the conversion module, and sets the sampled data point equal to the received sampled data point minus the predetermined quiescent level if the sampled data point is greater than or equal to the predetermined quiescent level, and sets the sampled data point equal to the predetermined quiescent level minus the received sampled data point minus if the sampled data point is less than or equal to the predetermined quiescent level.

5. The apparatus of claim 1, wherein the rectification module comprises an analog rectifier that rectifies the electrical waveform to be received by the conversion module.

6. The apparatus of claim 1, wherein the statistically representative sampled value comprises an average sampled value.

7. A system comprising:
one or more stepper motors;
a plurality of tri-state drivers that drive a plurality of coils of the one or more stepper motors;
an analog to digital converter ("ADC") that
receives an electrical waveform produced in a non-driven coil of the one or more stepper motors by a magnetic field of a rotor of the stepper motor during a full step operation, and
samples the electrical waveform at intervals starting at a predetermined time for a predetermined period of time within the full step operation to yield a plurality of sampled data points;
a rectification module that rectifies the electrical waveform about a predetermined quiescent level;
a comparison module that
accumulates the sampled data points into a statistically representative sampled value, compares the representative sampled value to a predetermined threshold level, and indicates a stall of the rotor if the representative sampled value is less than the predetermined threshold level; and a controller that is in electrical communication with the plurality of tri-state drivers and the ADC and activates one or more of the rectification module and the comparison module.

8. The system of claim 7, wherein the rectification module receives the sampled data point from the ADC, and sets the sampled data point equal to the received sampled data point minus the predetermined quiescent level if the sampled data point is greater than or equal to the predetermined quiescent level, and sets the sampled data point equal to the predetermined quiescent level minus the received sampled data point minus if the sampled data point is less than or equal to the predetermined quiescent level.

9. The system of claim 8, further comprising a biasing resistor network, attached to a pole of the non-driven coil that is not connected toward the ADC, to bias the electrical waveform about the predetermined quiescent level.

10. The system of claim 7, wherein the rectification module comprises an analog rectifier that rectifies the electrical waveform to be received by the ADC.

11. The system of claim 7, further comprising a multiplexor that selects the electrical waveform produced in the non-driven coil from among the plurality of coils.

12. The system of claim 7, further comprising a voltage buffer that buffers the electrical waveform.

13. The system of claim 7, wherein the plurality of coils are driven with a displacement of one of 60 degrees and 90 degrees.

14. A computer program product comprising a computer readable medium having computer usable program code executable to perform operations, the operations of the computer program product comprising:

receiving an electrical waveform produced in a non-driven coil of a stepper motor by a magnetic field of a rotor of the stepper motor during a full step operation;

rectifying the electrical waveform about a predetermined quiescent level;

sampling the electrical waveform at intervals starting at a predetermined time for a predetermined period of time within the full step operation to yield a plurality of sampled data points;

averaging the sampled data points into an average sampled value;

comparing the average sampled value to a predetermined threshold level; and indicating a stall of the rotor if the average sampled value is less than the predetermined threshold level.

15. The computer program product of claim 14, further comprising an operation of calibrating that comprises the operations of:

receiving the electrical waveform produced in the non-driven coil of the stepper motor by the magnetic field of the rotor of the stepper motor during one or more full step operations;

sampling the electrical waveform at intervals starting at the predetermined time for the predetermined period of time within the one or more full step operations to yield a plurality of sampled data points;

averaging the sampled data points into an average quiescent sampled value; and initializing the predetermined quiescent level to the average quiescent sampled value.

16. A machine-implemented method comprising the steps of:

receiving an electrical waveform produced in a non-driven coil of a stepper motor by a magnetic field of a rotor of the stepper motor during a full step operation;

rectifying the electrical waveform about a predetermined quiescent level;

sampling the electrical waveform at intervals starting at a predetermined time for a predetermined period of time within the full step operation to yield a plurality of sampled data points;

accumulating the sampled data points into a statistically representative sampled value;

comparing the representative sampled value to a predetermined threshold level; and indicating a stall of the rotor if the representative sampled value is less than the predetermined threshold level.

17. The method of claim 16, wherein the step of accumulating comprises averaging the sampled data points.

18. The method of claim 16, wherein the step of rectifying comprises one of analog rectification and digital rectification.

19. The method of claim 16, wherein the step of receiving further comprises the steps of:

selecting the electrical waveform produced in the non-driven coil of the stepper motor through a multiplexor from among a plurality of coils of the stepper motor; and buffering the electrical waveform through a voltage buffer.

20. The method of claim 16, further comprising a step of calibrating that comprises the steps of:

receiving the electrical waveform produced in the non-driven coil of the stepper motor by the magnetic field of the rotor of the stepper motor during one or more full step operations;

sampling the electrical waveform at intervals starting at the predetermined time for the predetermined period of time within the one or more full step operations to yield a plurality of sampled data points;

accumulating the sampled data points into a statistically representative quiescent sampled value; and initializing the predetermined quiescent level to the statistically representative quiescent sampled value.

* * * * *